(12) United States Patent
Minami et al.

(10) Patent No.: US 7,500,904 B2
(45) Date of Patent: Mar. 10, 2009

(54) GLASS SUBSTRATE FOR INFORMATION RECORDING MEDIUM AND METHOD FOR PRODUCING SAME

(75) Inventors: Akihide Minami, Osaka (JP); Koichi Suzuki, Osaka (JP); Tamaki Horisaka, Osaka (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 10/530,644

(22) PCT Filed: Dec. 25, 2003

(86) PCT No.: PCT/JP03/16672

§ 371 (c)(1),
(2), (4) Date: Apr. 6, 2005

(87) PCT Pub. No.: WO2004/058451

PCT Pub. Date: Jul. 15, 2004

(65) Prior Publication Data

US 2006/0140105 A1    Jun. 29, 2006

(30) Foreign Application Priority Data

Dec. 26, 2002 (JP) .............................. 2002-378736

(51) Int. Cl.
*B24B 1/00* (2006.01)
(52) U.S. Cl. ........................................ 451/56; 451/443
(58) Field of Classification Search ................... 451/41, 451/56, 72, 443, 444, 37, 5
See application file for complete search history.

(56) References Cited

U.S. PATENT DOCUMENTS 5,571,373 A   11/1996   Krishna et al.
6,135,863 A   10/2000   Zhang et al.

(Continued)

FOREIGN PATENT DOCUMENTS

CN   1117203 A   2/1996

(Continued)

OTHER PUBLICATIONS

Office Action issued Jun. 10, 2008 for Japanese patent application corresponding to U.S. Appl. No. 10/530,644.

(Continued)

*Primary Examiner*—Robert Rose
(74) *Attorney, Agent, or Firm*—Sheridan Ross P.C.

(57) ABSTRACT

A glass substrate for an information recording medium is manufactured by polishing the surface of a raw material glass plate. The polishing of the raw material glass plate is divided into a step for performing a first polishing process to roughly polish the surface of the raw material glass plate to be smooth and a step for performing a second polishing process to finely polish the surface of the roughly polished raw material glass plate to be smoother. The first polishing process uses a polishing pad made of a synthetic resin foam and slides the polishing pad on the raw material glass plate surface while supplying a polishing agent to roughly polish the surface. A pad dressing process is performed on the polishing pad before being used in the first polishing process. The pad dressing process polishes the surface of the polishing pad by sliding the polishing pad on a pad dresser including abrasive grains.

15 Claims, 2 Drawing Sheets

U.S. PATENT DOCUMENTS 6,254,461 B1 * 7/2001 Benning et al. ............... 451/56
6,293,854 B1 * 9/2001 Kimura et al. ............... 451/56

FOREIGN PATENT DOCUMENTS

| EP | 1201367 A1 | 5/2002 |
| JP | 10-086056 | 4/1998 |
| JP | 11-154325 | 6/1999 |
| JP | 11-262854 | 9/1999 |
| JP | 2000-273444 | 10/2000 |
| JP | 2001-252871 | 9/2001 |
| JP | 2001-351227 | 12/2001 |
| JP | 2002-092867 | 3/2002 |
| JP | 2002-127017 | 5/2002 |
| JP | 2002-352422 | 6/2002 |
| JP | 2002-331460 | 11/2002 |
| JP | 2003-117823 | 4/2003 |

OTHER PUBLICATIONS

Office Action for corresponding Japanese Patent Application No. 2002-378736, dated Sep. 2, 2008.

* cited by examiner

GLASS SUBSTRATE FOR INFORMATION RECORDING MEDIUM AND METHOD FOR PRODUCING SAME

FIELD OF THE INVENTION

The present invention relates to a glass substrate for an information recording medium used in a magnetic disc, which is a magnetic recording medium for an information recording device such as a hard disc, a magneto-optical disc, and an optical disc or the like, and a method for manufacturing the same.

BACKGROUND OF THE INVENTION

Conventionally, a glass substrate for an information recording medium must have a surface that is as smooth as possible to enable recording of information with high density. Thus, the surface of the glass substrate is ground and polished in plural stages during manufacturing to suppress the formation of microscopic protuberances (refer to, for example, Japanese Laid-Open Patent Publication No. 11-154325). That is, the glass substrate is ground and polished in steps divided into rough grinding, fine grinding, first polishing, and second polishing (final polishing).

The first polishing is a step using a polishing device to polish the surface of the glass substrate with a hard polisher until the surface roughness Rmax thereof is about 10 nm. The second polishing is a step using the same polishing device as the first polishing step to polish the surface of the glass substrate with a soft polisher in place of the hard polisher. For the polishing agent of the first polishing and the second polishing, cerium oxide, zirconium oxide, and colloidal silica and the like containing particles of and silicon oxide is selected and used in accordance with the required polishing accuracy or the like.

Recent glass substrates are required to be recordable with higher density. To fulfill this requirement, the smoothness of the glass substrate surface must be improved. In order to improve smoothness, polishing must not only be divided into two stages of first polishing and second polishing but must further be divided into more stages, such as a third stage and a fourth stage. However, as the steps related to polishing become divided into many steps, tasks that are troublesome and that require a long period of time increase. Such tasks include transferring the glass substrate between polishing devices and performing cleaning between the steps. This has a shortcoming in that the productivity and yield decrease.

The present invention focuses on the above problem of the prior art. It is an object of the present invention to provide a glass substrate for an information recording medium that improves production efficiency and that increases the amount of production while maintaining quality, and a method for manufacturing the same.

SUMMARY OF THE INVENTION

To achieve the above object, one aspect of the present invention provides a method for manufacturing a glass substrate for an information recording medium manufactured by polishing the surface of a raw material glass plate. In the method, the polishing is divided into two steps, a step for performing a first polishing process to roughly polish the surface of the raw material glass plate to be smooth and a step for performing a second polishing process to finely polish the surface of the roughly polished raw material glass plate to be smoother. The first polishing process is a process, using a polishing pad made of a synthetic resin foam, that slides the polishing pad on the surface of the raw material glass plate while supplying a polishing agent to roughly polish the surface. A pad dressing process is performed on the polishing pad in advance before being used in the first polishing process. The pad dressing process is a process for polishing the surface of the polishing pad by sliding the polishing pad on a pad dresser including abrasive grains.

The pad dressing process is preferably performed so that the product of load ($g/cm^2$) applied to the polishing pad by the pad dresser and task time (min) required for the pad dressing process is 500 to 3000.

The pad dressing process is preferably performed so that polishing rate, which is a value indicating polishing amount per unit time in the first polishing process, is maintained in a predetermined range.

When the polishing rate obtained immediately after the pad dressing process is performed is used as a reference value, the polishing rate is preferably maintained between 80 and 100% of the reference value, and the pad dressing process is performed when the polishing rate is less than 80% of the reference value.

The mesh size of the pad dresser is preferably #325 to #600. The pad dresser is set such that when the pad dresser is arranged on the surface of the polishing pad, the weight applied to the surface of the polishing pad per 1 $cm^2$ is preferably between 0.5 and 2.0 g.

The rough polishing of the raw material glass plate in the first polishing process is performed until the raw material glass plate preferably has an arithmetic mean roughness (Ra), which is measured by an atomic force microscope, of 1.0 nm or less, an undulation height (Wa), which is measured by a multi-functional disc interferometer with a measuring wavelength ($\lambda$) of 0.4 to 5.0 mm, of 1.0 nm or less, and a microscopic undulation height (NRa), which is measured by a three-dimensional surface structure analyzing microscope with a measuring wavelength ($\lambda$) of 0.2 to 1.4 mm, is 0.3 nm or less.

The first polishing step is a process for roughly polishing the surface of the raw material glass plate in two stages, pre-polishing and post-polishing. Load applied to the raw material glass plate by the polishing pad in the first polishing process is preferably greater during pre-polishing than during post-polishing.

After undergoing the pad dressing process, the surface of the polishing pad preferably has an average undulation height, which is measured by a stylus measuring instrument with a measuring wavelength ($\lambda$) of 0.25 to 1.4 mm, of 4 to 25 µm, and a surface roughness, which is measured with a cut-off value ($\lambda$C) of 2.5 mm, of 3 to 8 µm.

When performing the pad dressing process, the load is preferably 20 to 100 $g/cm^2$. Task time for performing the pad dressing process is preferably 10 to 60 minutes.

The glass substrate preferably has an arithmetic mean roughness (Ra), which is measured by an atomic force microscope, of 0.4 nm or less, an undulation height (Wa), which is measured by a multi-functional disc interferometer with a measuring wavelength ($\lambda$) of 0.4 to 5.0 mm, of 0.5 nm or less, and a microscopic undulation height (NRa), which is measured by a three-dimensional surface structure analyzing microscope with a measuring wavelength ($\lambda$) of 0.2 to 1.4 mm, of 0.15 nm or less.

A further aspect of the present invention provides a polishing device for manufacturing a glass substrate for an information recording medium by polishing the surface of a raw material glass plate. The polishing device includes a polishing pad formed from a synthetic resin foam, and a pad dresser including abrasive grains. The polishing pad slides on the raw material glass plate when roughly polishing the surface of the raw material glass plate while supplying the surface of the raw material glass plate with a polishing agent, and the pad dresser slides on the surface of the polishing pad to polish the polishing pad.

The pad dresser has a circular-plate shape, and it is preferred that the diameter and thickness are substantially the same as the diameter and the thickness of the raw material glass plate.

DETAILED DESCRIPTION OF THE PREFERRED EMBODIMENTS

An embodiment of the present invention will now be described in detail with reference to the drawings.

During manufacturing of a glass substrate for an information recording medium, a raw material glass plate is cut out in a disc-shape from a sheet of glass plate. The center of the raw material glass plate includes a circular hole. The glass substrate is formed by polishing the surface of the raw material glass plate with a polishing device. The glass substrate is formed from a multicomponent glass material, such as soda lime glass, aluminosilicate glass, borosilicate glass, and crystallized glass that are manufactured using a float method, a downdraw method, a redraw method, or a press method. A magnetic film and a protective film made of metals or alloys of cobalt (Co), chromium (Cr), iron (Fe) and the like are formed on the surface of the glass substrate obtained from the raw material glass plate to configure a information recording medium such as a magnetic disc, a magneto-optical disc, and an optical disc.

Figure 1:
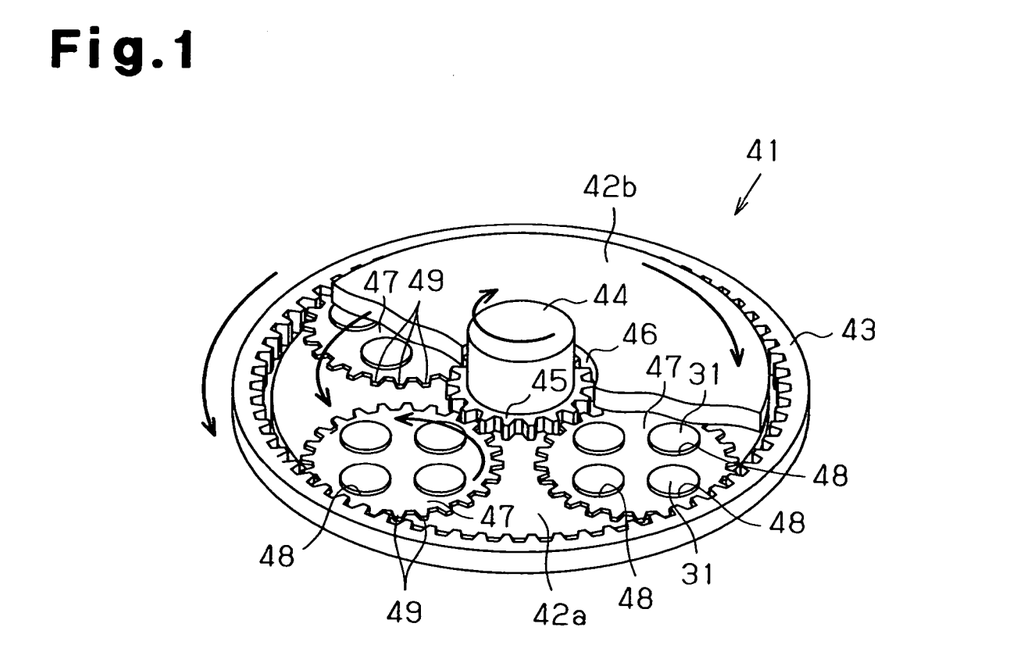
FIG. 1 is a cutaway perspective view showing part of a batch-type polishing device cut.

As shown in FIG. 1, a polishing device 41 includes a disc-shaped upper block 42b and lower block 42a that are parallel to each other and spaced from each other in the vertical direction. An annular internal gear 43 encircles the upper block 42b and the lower block 42a. A rotation shaft 44 projects from the center of the lower block 42a, and a sun gear 45 is arranged on the peripheral surface at the lower end of the rotation shaft 44. An insertion hole 46 is formed at the center of the upper block 42b, and the rotation shaft 44 is inserted through the insertion hole 46. The upper block 42b, the lower block 42a, the internal gear 43 and the sun gear 45 are driven by a motor or the like so as to be independently rotated. A plurality of carriers 47 is arranged between the lower block 42a and the upper block 42b. A plurality of circular holes 48 is formed in the carriers 47. Each circular hole 48 receives a raw material glass plate 31. Further, a gear 49 is formed on the peripheral portion of each carrier 47. The gears 49 are meshed with the internal gear 43 and the sun gear 45.

In the polishing device 41, a polishing pad, which is formed from synthetic resin foam, is attached to the surfaces of the lower block 42a and the upper block 42b when necessary. The raw material glass plate 31 is held between the lower block 42a and the upper block 42b or between a pair of polishing pads in a state received in a circular hole 48 of the carrier 47. In this state, polishing agent is supplied from a supply section (not shown) to the surface of the raw material glass plate 31 by way of the lower block 42a, the upper block 42b, and the polishing pad. A plurality of supply holes (not shown) extend in the thickness-wise direction on the lower block 42a, the upper block 42b, and the polishing pads. The polishing agent is supplied to the supply holes from a supply section, such as a tank containing the polishing agent. By rotating the upper block 42b, the lower block 42a, the internal gear 43, and the sun gear 45, each carrier 47 revolves about the rotation shaft 44 while rotating about its axis with the raw material glass plate 31 contacting the lower block 42a and the upper block 42b or the polishing pads. This polishes the surface of the raw material glass plate 31.

The method for manufacturing the glass substrate will now be described.

The glass substrate is manufactured through a disc processing step, a beveling step, a lapping step, a polishing step, and a washing step.

In the disc processing step, a sheet of glass plate is cut using a cutter made of cemented carbide or diamond to form a disc-shaped raw material glass plate having a circular central hole. In the beveling step, inner and outer circumferential surfaces of the raw material glass plate are ground so that the outer diameter and the inner diameter have predetermined dimensions and so that the edges of the inner and outer circumferential surfaces are polished and beveled.

In the lapping step, a lapping process is performed on the raw material glass plate to correct the warp of the entire raw material glass plate. Thus, the raw material glass plate becomes a substantially flat plate. The lapping process, which uses the polishing device 41, is performed by sliding the surface of the raw material glass plate 31 along the lower block 42a and the upper block 42b while supplying the polishing agent to grind the surface. Further, for the polishing agent of the lapping process, a slurry of abrasive grains, which are grains of alumina and the like, dispersed in water, which serves as a dispersion medium, is used.

The polishing step, which uses the polishing device 41, is performed in a state in which the polishing pads are attached to the lower block 42a and the upper block 42b by sliding the polishing pads along the surface of the raw material glass plate 31. In the polishing step, the sliding of the polishing pads polishes and smoothes the surface of the raw material glass plate. In the washing step, foreign materials, such as polishing agent, polishing powder, and dust on the surface of the raw material glass plate subsequent to polishing are washed away with a washing fluid. This manufactures a glass substrate having a smooth surface and high cleanliness.

The manufactured glass substrate has a surface roughness Ra of preferably 0.4 nm or less. Further, the undulation height Wa of the surface is preferably 0.5 nm or less. Moreover, the microscopic undulation height NRa of the surface is preferably 0.15 nm or less. The surface roughness Ra indicates a value measured with an atomic force microscope (AFM). The undulation height Wa of the surface is a value measured with a multifunctional disc interferometer (Optiflat) manufactured by Phase Metrix Corporation by scanning a predetermined region of the surface with a white light having a measuring wavelength ($\lambda$) between 0.4 to 5.0 mm. The microscopic undulation height NRa of the surface is a value measured with a three-dimensional surface structure analyzing microscope (New View 200) manufactured by Zygo Corporation by scanning a predetermined region of the surface using a white light having a measuring wavelength ($\lambda$) between 0.2 to 1.4 mm.

When the surface roughness Ra, the undulation height Wa and the microscopic undulation height NRa respectively exceed 0.4 nm, 0.5 nm, and 0.15 nm, the surface of the glass substrate roughens. Thus, the glass substrate may have lower smoothness and lower quality. When the glass substrate has low quality, the distance between the surface of the information recording medium and the head for reading the information recorded on the information recording medium cannot be shortened. Thus, high-density recording becomes difficult. This is because when the head moves on the information recording medium, deficiencies such as the head hitting or being caught in the undulations of the surface tend to occur.

In the conventional method for manufacturing the glass substrate, the polishing step is divided mainly into three stages, which include a step for performing a first polishing process, a step for performing a second polishing process, and a step for performing a third polishing step. This improves the quality of the manufactured glass substrate. The first polishing step, the second polishing step, and the third polishing step are respectively rough polishing, fine polishing and ultra-fine polishing of the glass substrate. The structure of the polishing device used for each process is the same. However, the polishing pads that are mainly used differ between the first polishing process and the second polishing process, and the polishing agents that are mainly used differ between the second polishing process and the third polishing step. This is to improve the smoothness of the polished raw material glass plate in a stepped manner as each process is performed. Since the optimal polishing pad and polishing agent are selected for use in each process, one polishing device is assigned for each process. This reduces the task time for replacing polishing pads and prevents mixing of different types of polishing agents.

In comparison, the polishing step of the present invention is divided into two steps, which include a step for performing a first polishing process to roughly polish and smooth the surface of the raw material glass plate and a step for performing a second polishing process to finely polish and further smooth the surface of the roughly polished raw material glass plate. That is, one feature is in that the polishing step is completed by two stages, which are the step for performing the first polishing process and the step for performing the second polishing process. This reduces the task time. Each process will now be described in detail.

The first polishing process is a process for removing defects such as, small warp, undulations, microscopic undulations, chipping, and cracks from the surface so that the entire raw material glass plate has a predetermined thickness. Among the defects, undulations are potentially present in the raw material glass plate and are mainly formed on the surface of a glass plate in streaks when a glass plate, which is the material of the raw material glass plate, is manufactured through the above mentioned float method and the like. That is, these defects are formed within a range of a substantially constant thickness (depth) from the surface of the raw material glass plate. Thus, when polishing and removing part of the surface so that the entire raw material glass plate has the predetermined thickness, the defects are removed together with part of the surface. Therefore, a first object of the first polishing process is to remove a certain part, which includes defects, from the surface of the raw material glass plate. The removal depth for rough polishing is considered to be important. Since the polishing step is performed to smooth the surface of the raw material glass plate, a state in which the surface of the raw material glass plate is rougher after the first polishing process than before the process would contradict the object of the polishing step. Therefore, a second object of the first polishing process is to smooth the surface of the roughly polished raw material glass plate. It is important that a certain part of the surface of the raw material glass plate be removed without damaging the surface.

The second polishing step is a process for scraping off an extremely small part of the surface of the raw material glass plate to correct microscopic defects such as, microscopic undulations and microscopic protuberances present on the surface. That is, in such microscopic defects, the high portions of undulations or the ridges of protuberances are scraped off to even the undulations and further flatten the surface of the glass substrate. Therefore, the object of the second polishing process is to polish and even the surface of the raw material glass plate into a smooth, mirror-finished surface. The removal depth for fine polishing is not important However, scraping off only the upper part of microscopic defects without damaging the surface of the raw material glass plate is considered important.

The first polishing process and the second polishing process are both performed to polish the surface of the raw material glass plate but have significantly different objects as mentioned above. More specifically, in the first polishing process, the amount of the surface including defects removed from the raw material glass plate, that is, the removal depth is considered important. It is not important that the surface of the raw material glass plate be scraped without being damaged. In comparison, in the second polishing process, the removal depth is not important. Evening only the defects remaining on the surface of the raw material glass plate, that is, smoothing the surface into a mirror-finished surface and polishing the surface of the raw material glass plate without damaging the surface is important. Thus, although the polishing device of the same structure is used in the first polishing process and the second polishing process, different polishing pads and polishing agents are used in accordance with the respective objects.

In the first polishing process, a hard polisher having hardness enabling the surface of the raw material glass plate to be scraped without greatly damaging the surface is used for the polishing pad to satisfy the objects of removing the surface at a constant removal depth and smoothing the surface of the raw material glass plate. For such a hard polisher, a rough sponge-like foam made of a synthetic resin, such as polyurethane or polyester, having a surface including visible bubbles may be used. The JIS A hardness of the hard polisher defined under JIS K6301 is preferably between 65 and 95. Further, the compressive elasticity modulus is preferably between 60 to 95%. It is preferred that the hard polisher be attached to the lower block 42a and the upper block 42b so that the compressibility is between 1 and 4%.

If the JIS A hardness is less than 65, the compressive elasticity modulus is less than 60%, or the compressibility is higher than 4%, the hard polisher does not have the desired hardness, and a long period of time is required to reach a certain removal depth. In addition, as the hard polisher deforms during polishing and, particularly, as protuberances and undulations form on the surface of the polisher, defects such as undulations may be formed on the surface of the raw material glass plate and the surface of the glass plate may not be smoothed. If the JIS A hardness is greater than 95, the compressive elasticity modulus is higher than 95%, or the compressibility is less than 1%, the surface of the raw material glass plate may be damaged by the hard polisher, and the surface condition may roughen.

In the second polishing process, a soft polisher having softness enabling polishing of the surface of the raw material glass plate without greatly scraping the surface is used for the polishing pad to satisfy the object of evening the surface of the raw material glass plate into a smooth mirror-finished surface. For such a soft polisher, a fine suede-like foam made of a synthetic resin, such as polyurethane or polyester, having a surface with bubbles that are not visible may be used. The Asker C hardness of the soft polisher defined under Society of Rubber Industry, Japan Standard SRIS-0101, is preferably between 58 and 85. The compressive elasticity modulus is preferably between 58 and 90%. It is preferred that the hard polisher be attached to the lower block 42a and the upper block 42b so that the compressibility is between 1 and 5%.

If the Asker C hardness is less than 58, the compressive elasticity modulus is less than 58%, or the compressibility is higher than 5%, the soft polisher may deform during polishing and, particularly, as protuberances and undulations form on the surface of the polisher, defects such as microscopic undulations may be formed on the surface of the manufactured glass plate. Further, if the Asker C hardness is greater than 85, the compressive elasticity modulus is higher than 90%, or the compressibility is less than 1%, the surface of the raw material glass plate may be damaged by the soft polisher, and the manufactured glass substrate may have a rougher surface. The suede-like soft polisher essentially differs greatly from the sponge-like hard polisher in hardness and is difficult to compare with the same criteria. Thus, the hard polisher is represented by JIS A hardness and the soft polisher is represented by Asker C hardness.

In the first polishing process, a slurry, in which grains having a mean grain diameter of about 1.2 μm are dispersed in water serving as a dispersion medium, is used as the polishing agent. Such grains include rare earth oxides, such as cerium oxide and lanthanum oxide, due to the superior polishing efficiency. Among such rare earth oxides, cerium oxide is more preferable since it chemically acts on glass material and effectively polishes the surface of the glass material.

In the second polishing process, a slurry, in which grains having a grain diameter smaller than that used in the first polishing process are dispersed in water serving as a dispersion medium, is used as the polishing agent. Such grains include grains of silicon oxide such as colloidal silica. The mean grain diameter ($D_{50}$) of the grain is preferably 0.1 μm or less. If $D_{50}$ exceeds 0.1 μm, the raw material glass plate may be damaged in the second polishing process, and the desired smoothness may not be obtained.

Completing the conventional polishing step with only two steps lowers quality, such as surface smoothness of the manufactured glass substrate, and prolongs the polishing time in each process. This is because the ultimately desired smoothness of the glass substrate cannot be obtained by simply omitting the conventional third polishing process and because the polishing time of the conventional third polishing process becomes longer if the conventional second polishing process is omitted. Particularly, protrusions referred to as ski jumps and depressions referred to as roll offs tend to form at the peripheral portion on the surface of the glass substrate. The polishing step corrects the shape of this peripheral portion. The reason the peripheral portion is shaped in this manner is in that the contact pressure of the polishing pad differs between the peripheral portion of the surface and other parts of the surface since the edges of the inner and outer circumferential surfaces of the raw material glass plate are subjected to the beveling step. If only the second polishing process and the third polishing process are omitted, the correction of the shape of the peripheral portion is insufficient. This would lower surface quality at the peripheral portion.

Therefore, in order to complete the polishing step in two steps while still maintaining or improving the quality of the manufactured glass substrate, the quality of at least one of the first polishing process or the second polishing process must be improved. The hard polisher and the soft polisher serving as the polishing pad used in each process is thereby subjected to a pad dressing process before being used for polishing and after being attached to the polishing device 41 to improve quality in the first polishing process and the second polishing process.

The pad dressing process is a process that uses a pad dresser and slides the polishing pad on the surface of the pad dresser to polish the surface of the polishing pad and remove protuberances and unevenness from the surface to form a flat surface. The pad dressing process is performed by holding the pad dresser between a pair of polishing pads with the polishing pads attached to the lower block 42a and the upper block 42b, respectively, in the polishing device 41 and rotating the lower block 42a and the upper block 42b.

In the present invention, the pad dressing process of the hard polisher used in the first polishing process is especially important. This is because it is an object of the present invention to improve the quality of the raw material glass plate roughly polished in the first polishing process to about the same level as that after the conventional second polishing process. Particularly, the surface of the raw material glass plate is more likely to be roughened compared to the second polishing process since the removal depth is important in the first polishing. This greatly affects quality improvement. In addition, substantially the same quality as the conventional second polishing process, which uses a soft polisher, must be obtained in the first polishing process of the present invention with a hard polisher.

Accordingly, the inventors selected the pad dresser used in the pad dressing process and the conditions of the pad dressing process to minimize defects of the surface of the hard polisher that directly affect the surface quality of the raw material glass plate. The surface quality refers to the quality of the entire surface, and includes the level of surface smoothness and the accuracy of the shape of the peripheral portion.

Figure 2:
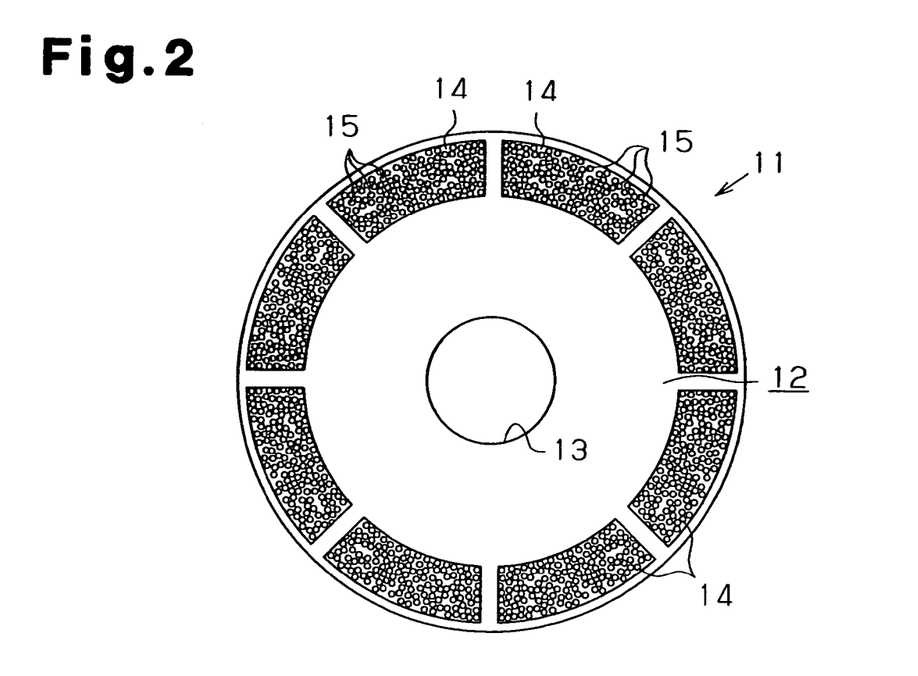
FIG. 2 is a plan view showing a pad dresser.

As shown in FIG. 2, the pad dresser 11 includes a circular plate 12 made of metal such as, stainless steel, aluminum, and steel, and a circular hole 13 is included at the center of the circular plate 12. In this circular plate 12, a plurality of grinding portions 14 are arranged near the periphery on the surface. The grinding portions 14 are generally trapezoidal and arranged at equally spaced in the circumferential direction of the circular plate 12. Each grinding portion 14 is formed by electrodepositing diamond abrasive grains 15 on the surface of the circular plate 12. The surface of the hard polisher is polished as the hard polisher slides along each grinding portion 14. Further, the grinding portions 14 increase the thickness of the pad dresser 11 and prevents the surface of the hard polisher from directly contacting the circular plate 12. This prevents the hard polisher from grinding the circular plate 12.

It is preferred that the size of the pad dresser 11 be substantially the same as the size of the manufactured raw material glass plate. More specifically, it is preferred that the diameter of the circular plate 12 be 65 to 95 mm, and the total thickness of the circular plate 12 and the thickness of the grinding portions 14 be 0.5 to 1 mm. When the size of the pad dresser 11 is substantially the same as the raw material glass plate, the weight of the pad dresser 11 is reduced, and the load is prevented from being applied to part of the hard polisher in a biased manner during pad dressing process. In addition, the pad dressing process is performed by accommodating the pad dresser 11 in each circular hole 48 of the carriers 47 of the polishing device 41 and by performing an operation similar to the first polishing process. In this case, portions of the hard polisher actually contacting the surface of the raw material glass plate during polishing are mainly corrected.

The weight of the pad dresser 11 is such that when the pad dresser 11 is arranged on the surface of the hard polisher, the weight applied to the surface of the hard polisher per 1 cm² is preferably between 0.5 and 2.0 g. If the weight applied to the surface per 1 cm² is less than 0.5 g, the circular plate 12 must be thinned to reduce weight. This would lower the strength of the pad dresser 11. When the strength of the pad dresser 11 is lowered in this manner, the pad dresser 11 deforms during the pad dressing process. This may roughen the surface of the hard polisher. If the weight exceeds 2.0 g, the pad dresser 11 is forced against the surface of the hard polisher, particularly the one attached to the lower block 42a, more than necessary. In this case, the surface of the hard polisher may be roughened during the pad dressing process, and defects such as protuberances and undulations form on the surface.

In the pad dresser 11, the mesh size of the grinding portion 14 is preferably #325 to #600. If the mesh size exceeds #600, the grain diameter of the abrasive grain 15 becomes small, the abrasive grains 15 easily fall off from the surface of the circular plate 12, the durability of the pad dresser 11 is shortened, and the pad dresser 11 must be frequently changed. If the mesh size is smaller than #325, the grain diameter of the abrasive grain 15 becomes large, the pad dresser 11 roughens the surface of the hard polisher, and forms defects such as protuberances and undulations on the surface.

The pad dressing process is performed over a predetermined task time while applying the necessary load to the hard polisher with the pad dresser 11. The load and the task time, which are the conditions for the pad dressing process, are in an inversely proportional relationship with respect to each other. Thus, the task time is long when the load applied to the hard polisher by the pad dresser 11 is small, and the task time is short when the load is large. The load and the task time are adjusted in accordance with the respective values. It is preferred that in the pad dressing process, the load (g/cm²) and the task time (min.) be such that their product be between 500 and 3000. If the product of the load and the task time is less than 500 or exceeds 3000, the pad dressing process cannot be sufficiently performed on the hard polisher or the pad dressing process is performed in an excessive manner. This would roughen the surface of the hard polisher and form defects on the surface.

More specifically, the load is preferably between 20 and 200 g/cm². If the load is less than 20 g/cm², the hard polisher cannot sufficiently slide on the pad dresser. Thus, the surface of the hard polisher may not be corrected. If the load exceeds 200 g/cm², the surface of the hard polisher is scraped more than necessary by the pad dresser. This may roughen the surface of form undulations. Further, the task time is preferably between 10 and 180 minutes. If the task time is less than 10 minutes, the pad dressing process is not sufficiently performed or the load must be applied more than necessary in accordance with the task time. If the task time exceeds 180 minutes, the effect of the pad dressing process does not further improve, and the amount of production reduces due to longer manufacturing time.

In the hard polisher after undergoing the pad dressing process, the average undulation height of the surface that contacts the raw material glass plate is preferably 4 to 25 μm. Further, the surface roughness is preferably 3 to 8 μm. The average undulation height is a value measured by a stylus measuring instrument of which measuring wavelength (λ) is 0.25 mm to 1.4 mm. The surface roughness is also a value measured by the stylus measuring instrument of which cut off value (λC) is 2.5 mm. In the pad dressing process, it is difficult for the average undulation height to be less than 4 μm and the surface roughness to be less than 3 μm. Further since this would take a long period of time, the amount of production may be decreased. The surface of a hard polisher having an average undulation height exceeding 25 μm and a surface roughness exceeding 8 μm is rough. When such a hard polisher is used to perform the first polishing process on a raw material glass plate, the surface quality of the raw material glass plate is low.

The above pad dressing process does not necessarily have to be carried out whenever the first polishing process is performed. The pad dressing process is preferably performed in accordance with the polishing rate in the first polishing process so that the polishing rate is maintained within a predetermined range. The polishing rate is a value indicating the removal depth of the raw material glass plate per unit time with the hard polisher in the first polishing process. The polishing rate, which uses a value measured immediately after the pad dressing process as a reference value, is preferably maintained between 80 and 100% of the reference value until the next pad dressing process is performed. If the polishing rate is less than 80%, the surface quality of the raw material glass plate lowers due to reduction in the polishing amount and the manufacturing time becomes longer. In this embodiment, the pad dressing process is performed when the polishing rate becomes less than 80%. In this way, when the pad dressing process is appropriately performed in accordance with the polishing rate, the durability of the hard polisher is prolonged. Further, the surface quality of the raw material glass plate as well as the manufacturing time is stabilized by maintaining the polishing rate.

In the first polishing process, it is preferred that the rough polishing of the raw material glass plate be divided into two stages, pre-polishing and post-polishing. In this case, regarding the load applied to the raw material glass plate by the polishing pad, the load of the pre-polishing is preferably higher than the load of the post-polishing. By raising the load of pre-polishing, the polishing rate for pre-polishing increases and a constant removal depth is rapidly removed from the surface portion of the raw material glass plate. Further, by lowering the load of post-polishing, the surface of the raw material glass plate is polished by the hard polisher without being greatly scraped. This increases the smoothness of the surface. That is, by changing the load between pre-polishing and post-polishing and having the load for pre-polishing being higher than the load for post-polishing, the surface of the raw material glass plate is rapidly removed at a constant removal depth while improving the smoothness of the surface.

When dividing rough polishing into the two stages of pre-polishing and post-polishing, the pre-polishing and the post-polishing are continuously performed, whereas the two steps of the first polishing process and the second polishing process would have to be performed intermittently. That is, the first polishing process and the second polishing process each use the assigned polishing device and thus the raw material glass plate is required to be transferred between polishing devices between polishing steps. In comparison, pre-polishing and post-polishing are continuously performed in the same polishing device by changing only the load. Therefore, when dividing the first polishing process into the two stages of pre-polishing and post-polishing, the transferring of the raw material glass plate is not required unlike when dividing the polishing step into two steps of the first polishing process and the second polishing process.

A raw material glass plate that undergoes the first polishing process using the hard polisher, which has undergone the pad dressing process, has a surface roughness of 1.0 nm or less in terms of arithmetic mean roughness Ra regulated by JIS B0601-1994. Further, the surface undulation height Wa is 1.0 nm or less. Moreover, the surface microscopic undulation height NRa is 0.3 nm or less. That is, in the raw material glass plate, when the arithmetic mean roughness Ra is 1.0 nm or less, the undulation height Wa is 1.0 nm or less, and the microscopic undulation height NRa is 0.3 nm or less, the smoothness is improved compared to the conventional first polishing process in the first polishing process. Thus, the polishing time in the second polishing process for correcting defects, such as microscopic undulations, does not have to be prolonged. Further, other polishing processes subsequent to the second polishing process do not have to be performed. Therefore, the polishing steps are completed by the second polishing process, and the polishing time required for the second polishing process is shortened. Undulations cannot be sufficiently corrected in the second polishing process and subsequent steps that use polishing agent of a fine grain diameter. Thus, it is preferred that the undulation height Wa in the first polishing process be 0.7 nm or less. The glass substrate manufactured from the raw material glass plate has a high surface quality.

The advantages of the above embodiment will now be described.

The glass substrate of the embodiment is manufactured by performing the polishing step including the two stages of the first polishing process and the second polishing process on the raw material glass plate. In the first polishing process, the hard polisher that is used is a polishing pad and has undergone pad dressing process. In the pad dressing process, the pad dresser 11 that is used includes the metal circular plate 12 on which diamond abrasive grains 15 are electrodeposited. Further, the grinding portions 14 are formed on the surface of the circular plate 12. The hard polisher slides on the grinding portions 14 of the pad dresser 11. This polishes the surface of the hard polisher and corrects the roughness so that the surface becomes flat. The raw material glass plate polished by the hard polisher with the flat surface has a high smoothness in which the arithmetic mean roughness Ra is 1.0 nm or less, the surface undulation height Wa is 1.0 nm or less, and the microscopic undulation height NRa is 0.3 nm or less subsequent to the first polishing process. Thus, a polishing process having a high polishing accuracy does not have to be performed after the second polishing process to improve the smoothness of the surface of the manufactured glass substrate. This ensures that the polishing step can be completed in a two-stage step. Accordingly, the number of stages relating to the polishing step is reduced, the production efficiency is improved, and the amount of production is increased while maintaining quality.

Further, in the pad dresser 11, the abrasive grains 15 are electrodeposited on the circular plate 12. This prevents deficiencies such as the surface of the circular plate being scraped when sliding on the hard polisher or the diamond polishing grains falling off from the circular plate. Thus, the roughness of the surface of the hard polisher is reliably corrected.

The pad dressing process is performed so that the product of the load (g/cm$^2$) applied to the hard polisher by the pad dresser 11 and the task time (min) is 500 to 3000. Thus, the surface of the hard polisher is corrected as required in a sufficient manner without roughening the surface.

The pad dressing process, which is not performed whenever the first polishing process is performed, is performed in accordance with the polishing rate in the first polishing process and when the polishing rate cannot satisfy the predetermined range. The polishing rate uses the polishing rate measured immediately after the pad dressing process is performed as a reference value and is maintained between 80 and 100% of the reference value. This prolongs the durability of the hard polisher. Further, the surface quality and the manufacturing time of the raw material glass plate are stabilized.

The mesh size of the grinding portions 14 on the pad dresser 11 is #325 to #600. This prevents deficiencies such as the abrasive grains 15 falling off from the circular plate 12, the surface roughness of the hard polisher not being corrected, and the surface of the hard polisher being roughened by the pad dressing process. Accordingly, while maintaining the durability of the pad dresser 11, the surface of the hard polisher is flattened and the surface smoothness of the raw material glass plate that undergoes the first polishing process with the hard polisher is improved.

The weight of the pad dresser 11 is such that when the pad dresser 11 is placed on the surface of the hard polisher, the weight applied to the surface of the hard polisher per 1 cm$^2$ is between 0.5 and 2.0 g. This prevents the strength of the pad dresser 11 from decreasing and prevents deficiencies, such as the pad dresser 11 being pressed against the surface of the hard polisher more than necessary during the pad dressing process. Therefore, the surface of the hard polisher is flattened, and the surface smoothness of the raw material glass plate that undergoes the first polishing process with the hard polisher is improved.

Examples of the above embodiment will now be described.

EXAMPLE 1

The pad dressing process was performed on a sponge-like hard polisher made of polyurethane using the pad dresser 11 shown in FIG. 2, and the first polishing process was performed on a raw material glass plate with this hard polisher. In the first polishing process, the raw material glass plate was roughly polished by performing pre-polishing for 30 minutes under a load of 150 g/cm$^2$ and then performing post-polishing for a predetermined time under a load of 40 g/cm$^2$. The raw material glass plate was used as the sample for example 1. The mesh size of the pad dresser 11 was #600, and the size of the circular plate 12 was the same size as the raw material glass plate in which the thickness was 0.6 mm, the outer diameter was 65 mm, and the inner diameter was 20 mm.

COMPARATIVE EXAMPLE 1

The first polishing process was performed on a raw material glass plate with a hard polisher that has not undergone the pad dressing process. The hard polisher was the same as that used in example 1. Further, the first polishing process was performed in the same manner as in example 1. This was the sample for comparative example 1.

COMPARATIVE EXAMPLE 2

The pad dressing process was performed on a hard polisher using a pellet dresser, and the first polishing process was performed on a raw material glass plate using this hard polisher. The same hard polisher as example 1 was used, and the first polishing process was performed in the same manner as in example 1. This was the sample for comparative example 2. The pellet dresser has a plurality of diamond pellets, with a diameter of 16 mm, embedded in a base material having a diameter that is substantially the same size as a carrier that receives raw material glass plates. The pellet dresser also corrects the surface of the hard polisher but compared to the size of the abrasive grain 15 of the pad dresser 11, the diameter of the pellet is apparently different.

Figure 3:
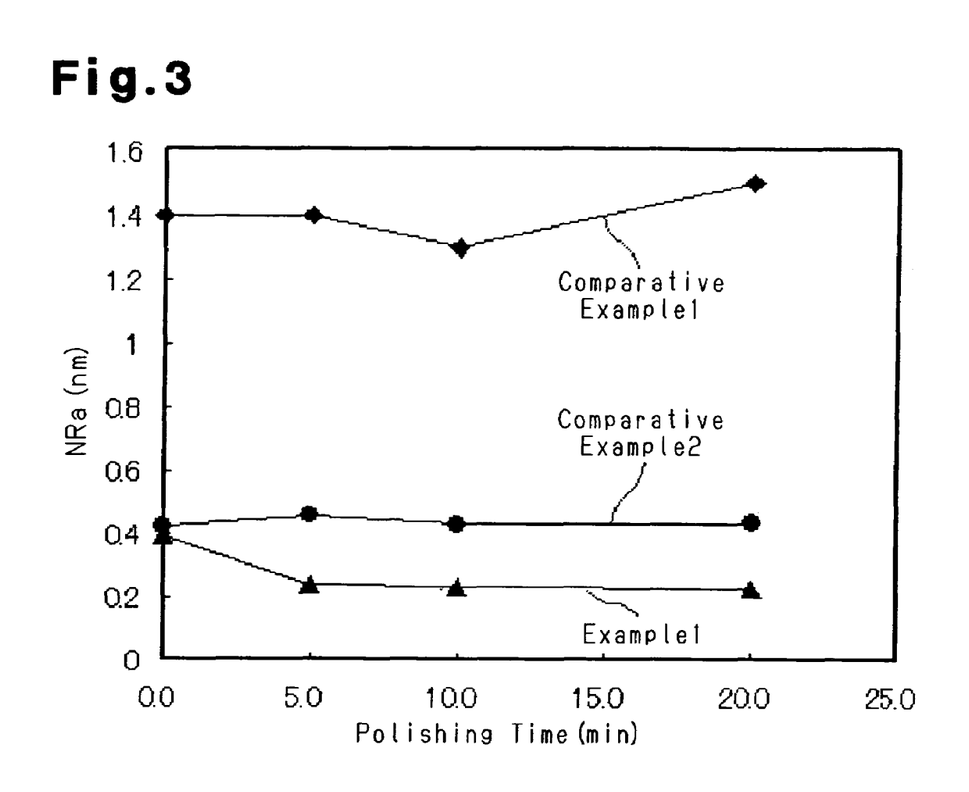
FIG. 3 is a graph showing the relationship between the polishing time and the height NRa of microscopic undulations in the surface of a glass substrate.

With regard to the samples of example 1, comparative example 1, and comparative example 2, the relationship between the polishing time and the microscopic undulations in the post-polishing of the first polishing process is shown in the graph of FIG. 3. The graph shows that in example 1, the microscopic undulation height NRa was reduced from 0.4 nm to 0.2 nm in the polishing time of 5 minutes and then maintained at 0.2 nm.

In comparison, in comparative example 1, the microscopic undulation height NRa remained at approximately 1.4 nm and did not improve regardless of the polishing time. When the polishing time exceeded 10 minutes, the microscopic undulation height NRa increased as the polishing time elapsed Further, in comparative example 2, the microscopic undulation height NRa did not increase as in comparative example 1 but was maintained at 0.4 nm, which was the initial value, and did not decrease as in example 1.

From these results, it is apparent that by performing the pad dressing process, the microscopic undulations of the raw material glass plate was maintained or reduced and did not increase. Further, by using the pad dresser 11, microscopic undulations were decreased.

Examples 2 and 3 and comparative examples 3 and 4 were performed under the conditions indicated in table 1 to obtain glass substrates used as samples for examples 2 and 3 and comparative examples 3 and 4. The item entitled "pad dressing process" in table 1 indicates the type of dresser that was used. Further, "load" in table 1 indicates that the first polishing process was divided into the two stages of pre-polishing and post-polishing. Further, for "time required for polishing step" in table 1, +15 min indicates the transferring time of the raw material glass plate between polishing devices.

TABLE 1

| | | Polishing Condition | First Polishing Process | Second Polishing Process | Third Polishing Process | Total Time of Polishing Step |
|---|---|---|---|---|---|---|
| Ex. 2 | Polishing Condition | Pad Dressing Process | Pad Dresser | Pad Dresser | | |
| | | Polishing Abrasive | Cerium Oxide | Colloidal Silica | | |
| | | Grain Abrasive | 1 μm | 0.05 μm | | |
| | | Grain Diameter Load | 150 g/cm² (30 min) + 40 g/cm² (5 min) | 25~100 g/cm² | None | |
| | | Time Required for Polishing | 35 min + 15 min | 10 + 15 min | | 75 min |
| | | Removal Depth | 35 μm | 1 μm | | |
| | Polishing Surface | NRa(nm) | 0.23 | 0.12 | | |
| | | Ra(nm) | 1 | 0.23 | | |
| Ex. 3 | Polishing condition | Pad Dressing Process | Pad Dresser | Pad Dresser | | |
| | | Polishing Abrasive | Cerium Oxide | Colloidal Silica | | |
| | | Grain Abrasive | 1 μm | 0.02 μm | | |
| | | Grain Diameter Load | 150 g/cm² (30 min) + 40 g/cm² (5 min) | 25~100 g/cm² | None | |
| | | Time Required for Polishing Step | 35 min + 15 min | 20 + 15 min | | 85 min |
| | | Removal Depth | 35 μm | 1 μm | | |
| | Polishing Surface | NRa(nm) | 0.22 | 0.12 | | |
| | | Ra(nm) | 1.1 | 0.18 | | |
| Comp. Ex. 3 | Polishing Condition | Pad Dressing Process | Pellet Dresser | Pad Dresser | Pad Dresser | |
| | | Polishing Abrasive | Cerium oxide | Cerium oxide | Colloidal Silica | |
| | | Grain Abrasive | 1 μm | 0.8 μm | 0.05 μm | |
| | | Grain Diameter Load | 150 g/cm² (25 min) + 40 g/cm² (5 min) | 25~150 g/cm² | 25~100 g/cm² | |
| | | Time Required for Polishing Step | 30 min + 15 min | 20 min + 15 min | 10 min + 15 min | 105 min |
| | | Removal Depth | 35 μm | 10 μm | 1 μm | |
| | Polishing Surface | NRa (nm) | 0.42 | 0.2 | 0.12 | |
| | | Ra (nm) | 1.1 | 0.5 | 0.22 | |
| Comp Ex. 4 | Polishing Condition | Pad Dressing Process | Pellet Dresser | Pad Dresser | Pad Dresser | |
| | | Polishing Grain Diameter | 1 μm | 0.8 μm | 0.02 μm | |
| | | Load | 150 g/cm² (25 min) + 40 | 25~150 g/cm²2 | 25~100 g/cm²2 | |

TABLE 1-continued

|  | Polishing Condition | First Polishing Process | Second Polishing Process | Third Polishing Process | Total Time of Polishing Step |
|---|---|---|---|---|---|
|  |  | g/cm² (5 min) |  |  |  |
|  | Time Required for Polishing Step | 30 min + 15 min | 20 min + 15 min | 20 min + 15 min | 115 min |
|  | Removal Depth | 35 μm | 10 μm | 1 μm |  |
| Polishing surface | NRa(nm) | 0.42 | 0.2 | 0.12 |  |
|  | Ra(nm) | 1.1 | 0.5 | 0.19 |  |

From the results of table 1, in examples 2 and 3, the microscopic undulation height NRa of the raw material glass plate after the first polishing process was 0.23 nm and 0.22 nm, respectively. This indicates that the polishing process can be ended by the second polishing process. In comparison, in comparative examples 3 and 4, the microscopic undulation height NRa after the second polishing process was 0.2 nm. This is approximately the same value as after the first polishing process in examples 2 and 3. With regard to comparative examples 3 and 4, approximately the same NRa value as after the second polishing process of examples 2 and the 3 was obtained only after the third polishing process was performed. With regard to comparative examples 3 and 4, when the polishing step was performed by simply omitting only the second polishing process, the peripheral portion of the raw material glass plate did not have the desired shape after the first polishing process. The shape of the peripheral portion could not be corrected even when the third polishing process was performed over a long period of time. Thus, the glass substrate could not ultimately satisfy the minimum specification required for the glass substrate.

From these results, in examples 2 and 3, the microscopic undulation height NRa obtained through the first polishing process was substantially the same as that obtained through the comparative examples 3 and 4 in the second polishing process, which are the conventional polishing steps. This shows that the polishing step can be completed without performing the third polishing process. With regard to the total time of the polishing step, examples 2 and 3 were shorter than comparative examples 3 and 4 by about 20 to 40 minutes. This shows that a glass substrate with high quality can be obtained in a short period of time.

The present embodiment may be modified and embodied as described below.

A chemical strengthening process may be performed on the raw material glass plate in a step preceding the polishing step, a step after the polishing step, or between each polishing step to satisfy the impact resistance, vibration resistance, and heat resistance characteristics required for a information recording medium. The chemical strengthening process refers to ion converting a monovalent metal ion such as lithium ion and sodium ion contained in the composition of the glass substrate to a monovalent metal ion such as sodium ion and potassium ion having a greater ionic radius. Further, it is a method for enabling chemical strengthening by applying compression stress on the surface of the glass substrate. The chemical strengthening method is performed by dipping the glass substrate over a predetermined time into a chemical strengthening process fluid obtained by heating and melting a chemical strengthening salt. Examples of chemical strengthening salts include potassium nitrate, sodium nitrate, silver nitrate used independently or as a mixture of at least two of the above materials. The temperature of the chemical strengthening fluid is a temperature that is preferably lower than the distortion point of the material used in the glass substrate by about 50 to 150° C., and more preferably the temperature of the chemical strengthening process fluid itself is about 300 to 450° C. When the temperature is lower than the distortion point of the material of the glass substrate by about 150° C., the glass substrate cannot be sufficiently subjected to the chemical strengthening process. If the temperature exceeds a temperature that is lower than the distortion point of the material of the glass substrate by about 50° C., the glass substrate may be distorted when performing the chemical strengthening process on the glass substrate.

The lapping step may be omitted as long as the surface conditions of the raw material glass plate, such as roughness, warp, undulations, and the like, satisfy the desired values after the beveling step. In such a case, the task time is further shortened.

The soft polisher used in the second polishing process may be used as the polishing pad used in the first polishing process. In this manner, when the same polishing pad is used in the first polishing process and in the second polishing process, the first polishing process and the second polishing process of the polishing step may be performed by the same polishing device. This enables the task for transferring the raw material glass plate between polishing devices to be omitted and further shorten the manufacturing time.

A buff polishing process may be performed on the polishing pad before performing the pad dressing process. The buff polishing process is a process for polishing the surface of the polishing pad so that it becomes slightly rougher than in the pad dressing process using polishing material, such as a grinding stone, sandpaper, and a polishing agent, irrespective of the attachment of the polishing pad to the polishing device 41. When the buff polishing process is performed in advance in this manner, the task time for the pad dressing process is shortened, and the amount of production is further increased.

When the first polishing process is divided into the two stages of pre-polishing and post-polishing, in addition to changing the load, the polishing device may be supplied with different types of polishing agents. In such a case, it is preferred that the polishing agent for the pre-polishing have a coarser grain size than the polishing agent for the post-polishing. This further increases the polishing rate for pre-polishing and enables the surface of the raw material glass plate to be more smoothly polished during post-polishing.

The invention claimed is:

1. A method for manufacturing a glass substrate for an information recording medium manufactured by polishing the surface of a raw material glass plate, the method comprising:

performing a first polishing process pad of a hard polisher to roughly polish the surface of the raw material glass plate to be smooth; and a second polishing process with a polishing pad of a soft polisher to finely polish the surface of the roughly polished glass raw plate to be smoother;

wherein the surface of the polishing pad of the hard polisher that contacts the raw material glass has an average undulation height, as measured by a stylus measuring instrument with a measuring wavelength of 0.25 to 1.4 mm, of 4 to 25 µm, and a surface roughness as measured with a cut-off value of 2.5 mm, of 3 to 8 µm, wherein the polishing pad of the hard polisher is subjected to a pad dressing process before being used in the first polishing process to polish the surface of the polishing pad by sliding the polishing pad on a pad dresser, which includes abrasive grains, and wherein the pad dressing process is performed so that the product of a load applied to the polishing pad by the pad dresser (in g/cm$^2$) and a task time, in minutes, required for the pad dressing process is 500 to 3000.

2. The method for manufacturing a glass substrate for an information recording medium according to claim 1, wherein, when the pad dressing process is performed so that a polishing rate, which is a value indicating polishing amount per unit time in the first polishing process, is maintained in a predetermined range.

3. The method for manufacturing a glass substrate for an information recording medium according to claim 2, wherein, when the polishing rate obtained immediately after the pad dressing process is performed is used as a reference value, the pad dressing process is performed when the polishing rate is less than 80% of the reference value.

4. The method for manufacturing a glass substrate for an information recording medium according to claim 1, wherein the grit of the pad dresser is #325 to #600.

5. The method for manufacturing a glass substrate for an information recording medium according to claim 1, wherein the pad dresser is set such that when the pad dresser is arranged on the surface of the polishing pad, the weight applied to the surface of the polishing pad per 1 cm$^2$ is between 0.5 and 2.0 g.

6. The method for manufacturing a glass substrate for an information recording medium according to claim 1, wherein the rough polishing of the raw material glass plate in the first polishing process is performed until the glass raw plate has an arithmetic mean roughness as measured by an atomic force microscope, of 1.0 nm or less, an undulation height as measured by a multi-functional disc interferometer with a measuring wavelength of 0.4 to 5.0 mm, of 1.0 nm or less, and a microscopic undulation height as measured by a three-dimensional surface structure analyzing microscope with a measuring wavelength of 0.2 to 1.4 mm, is 0.3 mm or less.

7. The method for manufacturing a glass substrate for an information recording medium according to claim 1, wherein the first polishing process is for roughly polishing the surface of the raw material glass plate in two stages, pre-polishing and post-polishing, wherein load applied to the glass raw plate by the polishing pad in the first polishing process is greater during pre-polishing than during post-polishing.

8. The method for manufacturing a glass substrate for an information recording medium according to claim 1, wherein when performing the pad dressing process, a load of 20 to 100 g/cm$^2$ is applied.

9. The method for manufacturing a glass substrate for an information recording medium according to claim 1, wherein a task time for performing the pad dressing process is 10 to 60 minutes.

10. The method for manufacturing a glass substrate for an information recording medium according to claim 1, wherein the pad dressing process is performed so that polishing rate, which is a value indicating polishing amount per unit time in the first polishing process, is maintained in a predetermined range.

11. The method for manufacturing a glass substrate for an information recording medium according to claim 10, wherein, when the polishing rate obtained immediately after the pad dressing process is performed is used as reference value, the polishing rate is maintained between 80 and 100% of the reference value, and the pad dressing process is performed when the polishing rate is less than 80% of the reference value.

12. The method for manufacturing a glass substrate for an information recording medium according to claim 1, wherein the grit of the pad dresser is #325 to #600.

13. The method for manufacturing a glass substrate for an information recording medium according to claim 1, wherein the rough polishing of the raw material glass plate in the first polishing process is performed until the glass raw plate has an arithmetic mean roughness as measured by an atomic force microscope, of 1.0 nm or less, an undulation height as measured by a multi-functional disc interferometer with a measuring wavelength 0.4 to 5.0 mm, of 1.0 nm or less, and a microscopic undulation height as measured by a three-dimensional surface structure analyzing microscope with a measuring wavelength of 0.2 to 1.4 mm, is 0.3 nm or less.

14. The method for manufacturing a glass substrate for an information recording medium according to claim 1, wherein the first polishing process is for roughly polishing the surface of the raw material glass plate in two stages, pre-polishing and post-polishing, wherein load applied to the glass raw plate by the polishing pad in the first polishing process is greater during pre-polishing than during post-polishing.

15. The method for manufacturing a glass substrate for an information recording medium according to claim 1, wherein after undergoing the pad dressing process, the surface of the polishing pad has an average undulation height as measured by a stylus measuring instrument with a measuring wavelength of 0.25 to 1.4 mm, of 4 to 25 µm, and a surface roughness as measured with a cut-off value of 2.5 mm, of 3 to 8 µm.

* * * * *